UNITED STATES PATENT OFFICE.

WILLIAM R. MOTT, OF LAKEWOOD, OHIO, ASSIGNOR, BY MESNE ASSIGNMENTS, TO NATIONAL CARBON COMPANY, INC., A CORPORATION OF NEW YORK.

ARC-LAMP ELECTRODE.

1,289,514.     Specification of Letters Patent.     Patented Dec. 31, 1918.

No Drawing.     Application filed January 28, 1916. Serial No. 74,732.

*To all whom it may concern:*

Be it known that I, WILLIAM R. MOTT, a citizen of the United States, residing at Lakewood, in the county of Cuyahoga and State of Ohio, have invented a certain new and useful Improvement in Arc-Lamp Electrodes, of which the following is a full, clear, and exact description.

This invention relates to arc lamp electrodes.

There are many different kinds of salts, metals and other materials that are added to arc lamp electrodes for the production of a flaming arc. Among such substances may be mentioned compounds of the rare-earth metals, the principal source of which is the Welsbach residue. When obtained from this source they contain about 50% cerium compounds with smaller proportions of the other members of the cerium group, such as lanthanum, neodymium, praseodymium, samarium and gadolinium, and some few terbium elements. They also usually contain 1 to 15% of the yttrium group of which the two important members are yttrium and erbium with small amounts of ytterbium, holmium, thulium, dysprosium and scandium.

The rare-earths have been used in lamp electrodes in the form of oxids and fluorids chiefly, for the production of a white light of high candle power. Very little effect, however, has been obtained from any other constituent than cerium on account of the low content of the other rare-earth materials.

I have found that the yttrium group of rare-earth metals, which contains yttrium, erbium, with small amounts of ytterbium, holmium, thulium, dysprosium, and scandium, as mentioned above, when used in flaming arc lamp electrodes with a carbon shell or body, gives a bright red light of remarkably high candle power which is especially due to the yttrium. In fact, the yttrium group gives a higher candle power than any other of the rare-earths, although heretofore cerium has been supposed to be the rare-earth element that produced the highest candle power.

In order to secure the beneficial result of yttrium, it should be separated from the other rare-earth elements in the Welsbach residue, particularly cerium, as the latter so greatly predominates over the former as to overshadow it in its influence. To separate the yttrium group from the other rare-earths in the Welsbach residue, I may employ a process which consists in double alkali sulfate precipitation of the cerium group.

Absolutely pure yttrium compounds are by no means essential to my invention. For practical results the following procedure, among others, can be used. The rare-earths are dissolved as hydroxids, carbonates or oxids in hydrochloric acid and evaporated with a very slight excess of hydrochloric acid and then the solution is diluted and saturated with fine sodium sulfate at 50-60° C. On standing, practically all of the cerium and part of the terbium compounds settle out as double sulfates with sodium. In the filtrate the rest of the terbium and yttrium earths remain in solution. In this process potassium sulfate can also be used.

The yttrium materials after having been thus purified are preferably mixed with 30 to 60% of carbon and cored in carbon shells with suitable binders such as alkali silicates, glucose, tar-benzol, etc., and then dried or baked as most suitable. In some cases calcium fluorid may be added when other rare-earths are used in conjunction with yttrium compounds, but in order to get the best results from my invention the yttrium compounds should exceed a 1 to 2 ratio with the other rare-earths. For color-photography and pan-chromatic photography, an excess of the longer light wave lengths is very important for best artistic results and best economy. For this purpose yttrium materials, especially the crude yttrium group of the Welsbach residue, may be used in mixtures with calcium fluorid, strontium fluorid, rare-earth titanates and other compounds to secure the exact proper proportion of each color to give the best effects without using a color screen or at the most a very light color screen.

I have found by spectroscopic examination that yttrium gives a great predominance of red light. The colors are less mixed than with strontium fluorid which has besides its red bands some intense yellow bands. Calcium fluorid has strong red bands but these are mixed with strong green bands. Consequently the eye sees only yellow light with calcium fluorid, due to the blending of the red and green. For advertising effects with red light, a proportion of 50%, or even higher, of the total rare-earths, is preferable.

It has been proposed in prior patents to use a plurality of flaming salts among which happens to be mentioned yttrium, but in every case the flaming element used is only a few per cent. of the mixture and is not used with carbon. It has been stated that yttrium would give a white light, whereas it produces red light in combination with carbon. This probably resulted from the fact that yttrium was never tried out as a flaming constituent or else was used in such small proportion as to weaken its effect.

Another peculiar property of yttrium oxid or other yttrium compound is that it colors the arc green when the arc springs from the yttrium oxid itself, whereas the arc is colored a brilliant red when the arc springs from carbon containing yttrium. There is therefore a peculiar combination between the carbon and the yttrium oxid, fluorid or other salt of yttrium.

The best compounds of yttrium and the other members of its group seem to be the oxid $Y_2O_3$, the fluorid $YF_3$ and the oxyfluorid. Also the mineral yttrofluorite ($YF_3 \cdot 7CaF_2$) gives good results. The metal yttrium can also be used.

The yttrium group can also be added to solid flame carbons in which case it would be homogeneously mixed with carbon flour and an appropriate binder of pitch or other material and baked in the usual way. The flaming material, consisting of yttrium and calcium fluorid in such a carbon should constitute from 20 to 60% of the electrode, the calcium fluorid varying from 0 to 50% of the electrode.

Having described my invention, what I claim is:—

1. An arc lamp electrode containing carbon and compounds of the rare-earth metals substantially free from cerium and one-third or more of which consists of yttrium material.

2. An arc lamp electrode containing carbon and over 5% of yttrium fluorid.

3. An arc lamp electrode containing carbon and fluorin compounds of yttrium.

4. An arc lamp electrode containing carbon, calcium fluorid and yttrium fluorid.

In testimony whereof, I hereunto affix my signature.

WILLIAM R. MOTT.